(12) United States Patent
Zheng et al.

(10) Patent No.: US 9,715,221 B2
(45) Date of Patent: Jul. 25, 2017

(54) ONLINE CONTROL CALCULATION FOR MODELS CONTAINING NEAR COLINEARITY AND UNCERTAINTY

(71) Applicant: Aspen Technology, Inc., Burlington, MA (US)

(72) Inventors: Qingsheng Quinn Zheng, Sugar Land, TX (US); Michael R. Keenan, Sugar Land, TX (US); Magiel J. Harmse, Houston, TX (US)

(73) Assignee: Aspen Technology, Inc., Bedford, MA (US)

( * ) Notice: Subject to any disclaimer, the term of this patent is extended or adjusted under 35 U.S.C. 154(b) by 617 days.

(21) Appl. No.: 14/267,861

(22) Filed: May 1, 2014

(65) Prior Publication Data

US 2015/0316905 A1    Nov. 5, 2015

(51) Int. Cl.
*G05B 13/02*    (2006.01)
*G05B 13/04*    (2006.01)
*G05B 17/02*    (2006.01)

(52) U.S. Cl.
CPC ........... *G05B 13/048* (2013.01); *G05B 17/02* (2013.01)

(58) Field of Classification Search
CPC .................................. G05B 13/048
USPC ........................................ 700/29
See application file for complete search history.

(56) References Cited

U.S. PATENT DOCUMENTS

| 3,934,124 | A | 1/1976 | Gabriel |
| 5,347,446 | A | 9/1994 | Lino et al. |
| 5,351,184 | A | 9/1994 | Lu et al. |
| 5,394,322 | A | 2/1995 | Hansen |

(Continued)

FOREIGN PATENT DOCUMENTS

| EP | 0462815 A2 | 12/1991 |
| EP | 0 524 317 | 1/1993 |

(Continued)

OTHER PUBLICATIONS

G. Pannocchia, S. J. Wright and J. B. Rawlings, "Existence and computation of infinite horizon model predictive control with active steady-state input constraints," in IEEE Transactions on Automatic Control, vol. 48, No. 6, pp. 1002-1006, Jun. 2003. doi: 10.1109/TAC.2003.812783.*

(Continued)

*Primary Examiner* — James D Rutten
(74) *Attorney, Agent, or Firm* — Hamilton, Brook, Smith & Reynolds, P.C.

(57) ABSTRACT

A method, apparatus, and computer program product for increasing closed-loop stability in a MPC controller controlling a process where there are significant uncertainties in the model used by the controller. This invention focuses on the improvement of the robustness of the steady-state target calculation. This is achieved through the use of a user defined robustness factor, which is then used to calculate an economic objective function giveaway tolerance and controlled variable constraint violation tolerance. The calculation engine uses these tolerances to find a solution that minimize the target changes between control cycles and prevent weak direction moves caused by near collinearity in the model. If the controller continues to exhibit large varia- (Continued)

tions in the process, it can slow down the manipulated variable movement to stabilize the process.

12 Claims, 9 Drawing Sheets

(56) References Cited

U.S. PATENT DOCUMENTS

| | | | |
|---|---|---|---|
| 5,408,405 | A | 4/1995 | Mozumder et al. |
| 5,442,544 | A | 8/1995 | Jelinek |
| 5,541,833 | A | 7/1996 | Bristol et al. |
| 6,026,334 | A | 2/2000 | Kayihan et al. |
| 6,056,781 | A | 5/2000 | Wassick et al. |
| 6,373,033 | B1 | 4/2002 | de Waard et al. |
| 6,714,899 | B2 | 3/2004 | Kassmann |
| 6,745,088 | B2 | 6/2004 | Gagne |
| 7,231,264 | B2 | 6/2007 | Zheng et al. |
| 2002/0016640 | A1* | 2/2002 | Gagne .................. G05B 11/32 700/29 |
| 2006/0015194 | A9* | 1/2006 | Zheng .................. G05B 17/02 700/44 |
| 2007/0276512 | A1 | 11/2007 | Fan et al. |
| 2008/0065242 | A1 | 3/2008 | Attarwala et al. |

FOREIGN PATENT DOCUMENTS

| | | |
|---|---|---|
| EP | 0681714 B1 | 9/1999 |
| WO | WO 94/17458 | 8/1994 |
| WO | WO 2015/167741 | 11/2015 |

OTHER PUBLICATIONS

International Preliminary Report on Patentability for PCT/US2015/023904; dated Nov. 1, 2016; entitled: "Improved Online Control Calculation for Models Containing Near Colinearity and Uncertainty".

Notification of Transmittal of the International Search Report and the Written Opinion of the International Searching Authority, or the Declaration for PCT/US2015/023904; dated: Aug. 19, 2015; entitled: "Improved Online Control Calculation for Models Containing Near Colinearity and Uncertainty".

Hines, J.W. and Seibert, R., "Technical Review of On-Line Monitoring Techniques for Performance Assessment," *Division of Engineering Technology, Office of Nuclear Regulatory Research, U.S. Nuclear Regulatory Commission*, [http://www.orau.org/ptp/PTP%20Library/library/NRC/NUREG/6895v1.pdf], (Jan. 2006).

Qin, S.J & Badgwell, T.A., "A survey of industrial model predictive control technology", *Control Engineering Practice*, 11:733-764 (2003).

"Rockwell Automation: Software Makes Model Predictive Control Easier," *Automation World*, [http://www.automationworld.com/control/rockwell-automation-software-makes-model-predictive-control-easier], (Aug. 7, 2012).

Tran-Cao, T., "Model Predictive Control and Stabilisation of Interconnected Systems," Thesis (2011).

* cited by examiner

ONLINE CONTROL CALCULATION FOR MODELS CONTAINING NEAR COLINEARITY AND UNCERTAINTY

BACKGROUND OF THE INVENTION

Model Predictive Control (MPC) is the most widely used advanced process control technology applied in process industries. There are more than 10,000 worldwide applications currently in service. A MPC controller relies on a model to predict the process behavior (the controlled variables, CV) and makes changes to the manipulated variables (MV) so that it can keep the process running inside a prescribed constraint set. When inside the constraint set, a MPC controller can also make changes to MVs so that the process is optimized based on a given economic objective function. A MPC controller is a real-time application which runs from cycle to cycle with a fixed time interval (the typical cycle time is one minute) so that it can keep up with the process dynamics.

In a real-time industrial MPC application, there always exist uncertainties or errors in the model. The feedback correction in the controller can overcome the control errors caused by the model uncertainty; but significant model uncertainty may affect controller performance adversely. Further, strong interactions among multiple MVs and CVs in the model can affect the controller behavior in a significant way if some of them have a nearly collinear relationship. The control performance issues caused by model error and near collinearity may include oscillation of key variables, frequent violation of CV constraints, and the movement of MVs to undesirable operating points.

SUMMARY OF THE INVENTION

To overcome the shortcomings of the prior art, a new apparatus and method is disclosed for changing the way a MPC controller calculates its steady-state targets such that the controller can still perform despite facing significant model errors and suboptimal tuning.

Accordingly, in one embodiment, the present invention is a method, apparatus, or computer program product directed to increasing robustness in a Model Predictive Control (MPC) controller controlling a process. The process can have at least two manipulated variables, at least two controlled variables, and at least one active operation constraint. The method, apparatus, or computer program product comprise providing to the MPC controller a user defined robustness factor and calculating an economic objective giveaway tolerance and an active operation constraint violation tolerance using the user defined robustness factor; and identifying an ideal case optimum value for the process. Then, the method, apparatus, or computer program product further detects (i) if the at least two manipulated variables and the at least two controlled variables have a near collinear relationship with each other, and (ii) whether the calculated steady-state target values indicate movement of the at least two manipulated variables in a weak direction; and avoiding (or blocking) MPC controller movement of variables along the weak direction by adjusting the at least one active operation constraint according to the user defined robustness factor if the near collinear relationship is utilized in the calculation of steady-state target values, such that the MPC controller has increased robustness.

In another embodiment, the at least one active operation constraint is a plurality of active operation constraints, and each active operation constraint is assigned a priority, the active operation constraint with the lowest priority being adjusted first according to the user defined robustness factor.

In another embodiment, after adjusting the at least one active operation constraint according to the user defined robustness factor, the steps are repeated until substantially all movement of the at least two manipulated variables along a weak direction is avoided.

In another embodiment, the method, apparatus, and computer program product further comprise the steps of calculating a dynamic move plan for implementing the targets using the user defined robustness factor, and wherein the dynamic move plan employs a move suppression factor to adjust a rate of movement of the at least two manipulated variables towards the calculated steady state target values; and reducing the rate of movement of one of the manipulated variables by adjusting the move suppression factor if oscillation is detected by any manipulated variables.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
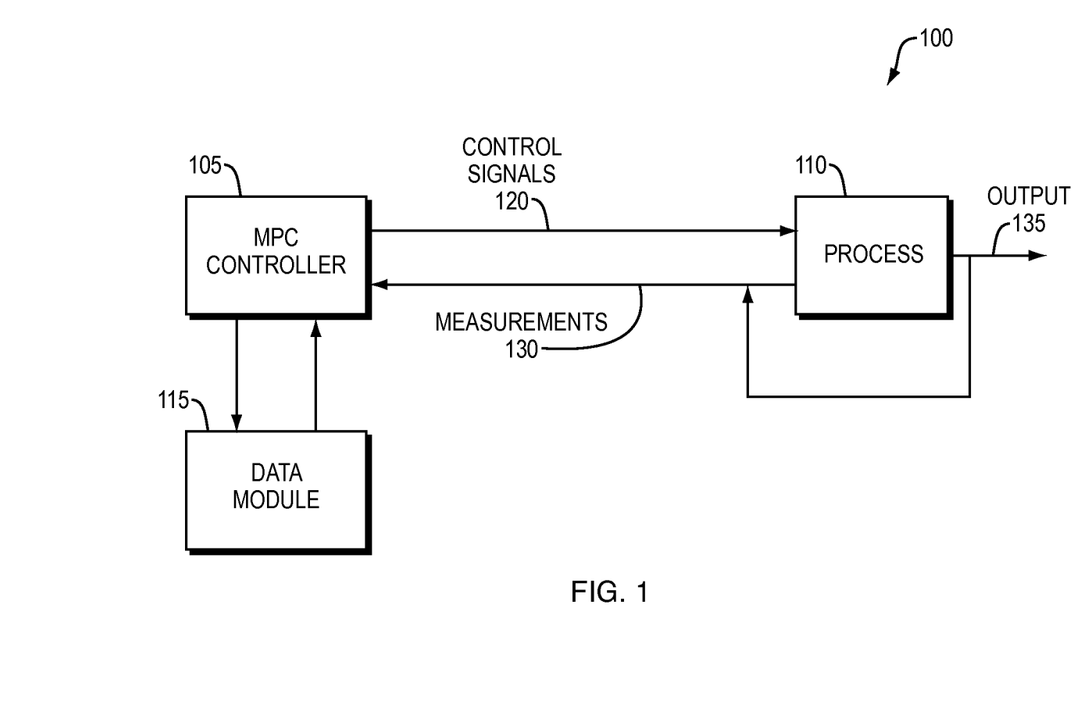
FIG. 1 is a schematic view of computer network environments hosting embodiments.

FIG. 1 is a block diagram that represents an example embodiment of an apparatus 100 of the present invention.

The MPC Controller 105 is connected to a subject process 110. The process 110 is generally performed in a plant which is a multivariable dynamic system equipped to take measurements 130 of the process parameters such as temperature, pressure, and quality of the product, and which uses actuators to control the process, such as valves and motors. The MPC controller 105 can include a tester, as shown in FIG. 1, or the tester can be a separate module. Additionally, the controller 105 can also be in communication with an automated data selection and on-line model identification module (data module) 115. The data module 115 can also be part of the MPC controller 105. The data module 115 contains a model of the subject process 110 that is connected to the MPC controller 105. The model is employed to predict the process 110 response to changes in the process conditions and to ensure that the process 110 continues to run as intended. But, the model cannot always predict the process 110 with absolute certainty. If, for example, a model shows sizable degrees of freedom in variables or not perfectly collinear, but the process 110 is perfectly collinear, calculations based on the model in the data module 115 may result in a divergence of the calculated solution of the model from the optimal solution of the process 110. When the model solutions move away from the optimized solution of the process 110, or when the MPC controller 105 overcorrects in an effort to optimize the subject process 110, this is referred to as a "weak direction," and may ultimately cause the subject process 110 to become unstable.

The MPC Controller 105 uses measurements 130 received from the process 110 or the output 135 of the process to adjust the model accordingly. The MPC Controller 105 then sends control signals 120 to the process 110 in order to push the process 110 towards the optimized solution of the process.

Figure 2:
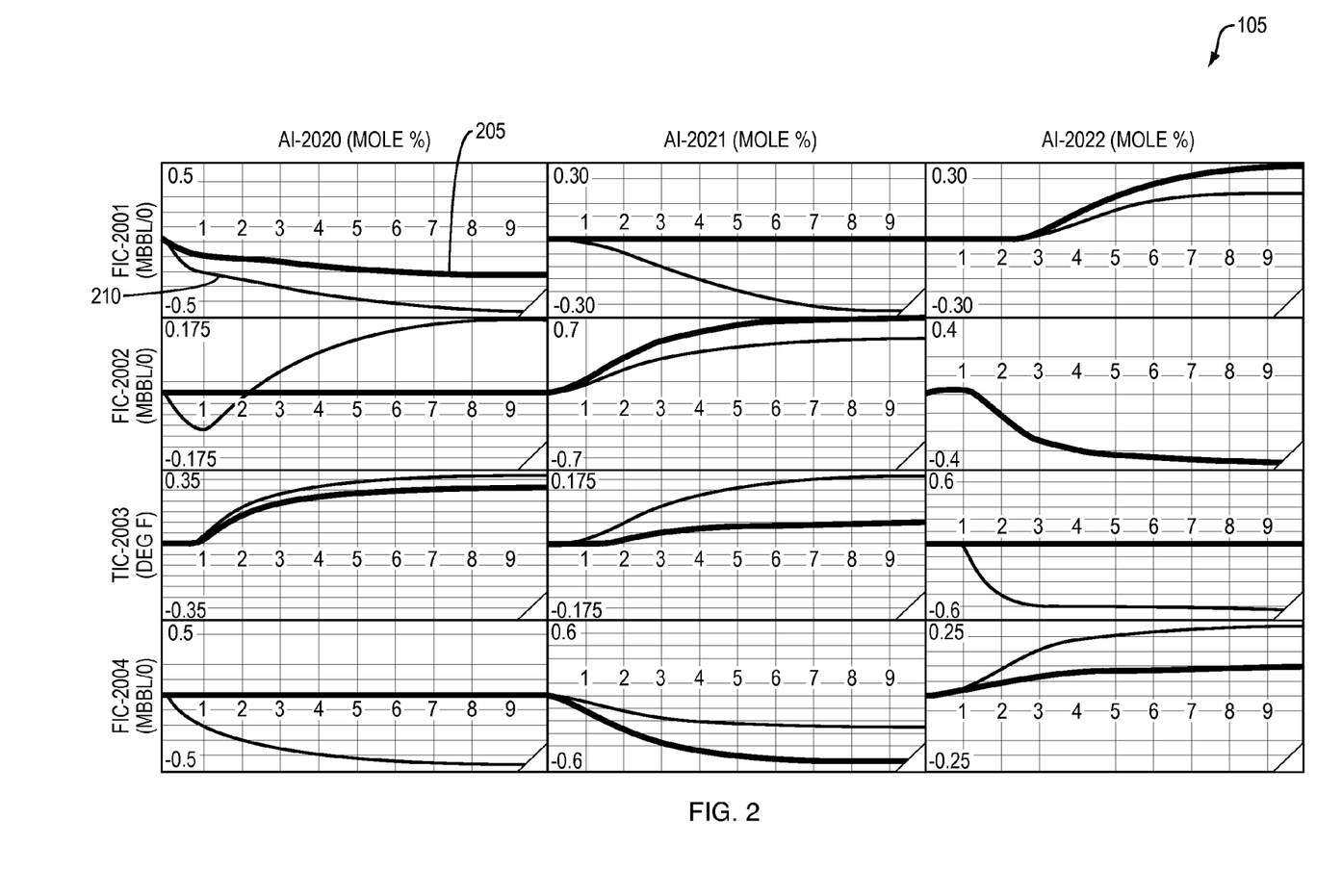
FIG. 2 is a series of screenviews illustrating graphs of a model representing a plant and a model used by an MPC controller.

FIG. 2 is a series of screenviews illustrating graphs of a model representing a plant and a model used by the MPC controller 105. The black line 205 represents the model used by the controller 105; the gray line 210 represents the plant. In each graph, the divergence of the black line 205 and the gray line 210 illustrate errors in the model's ability to accurately track the plant (subject) process 110. Correction of the errors in the MPC controller 105 is necessary.

Figure 3:
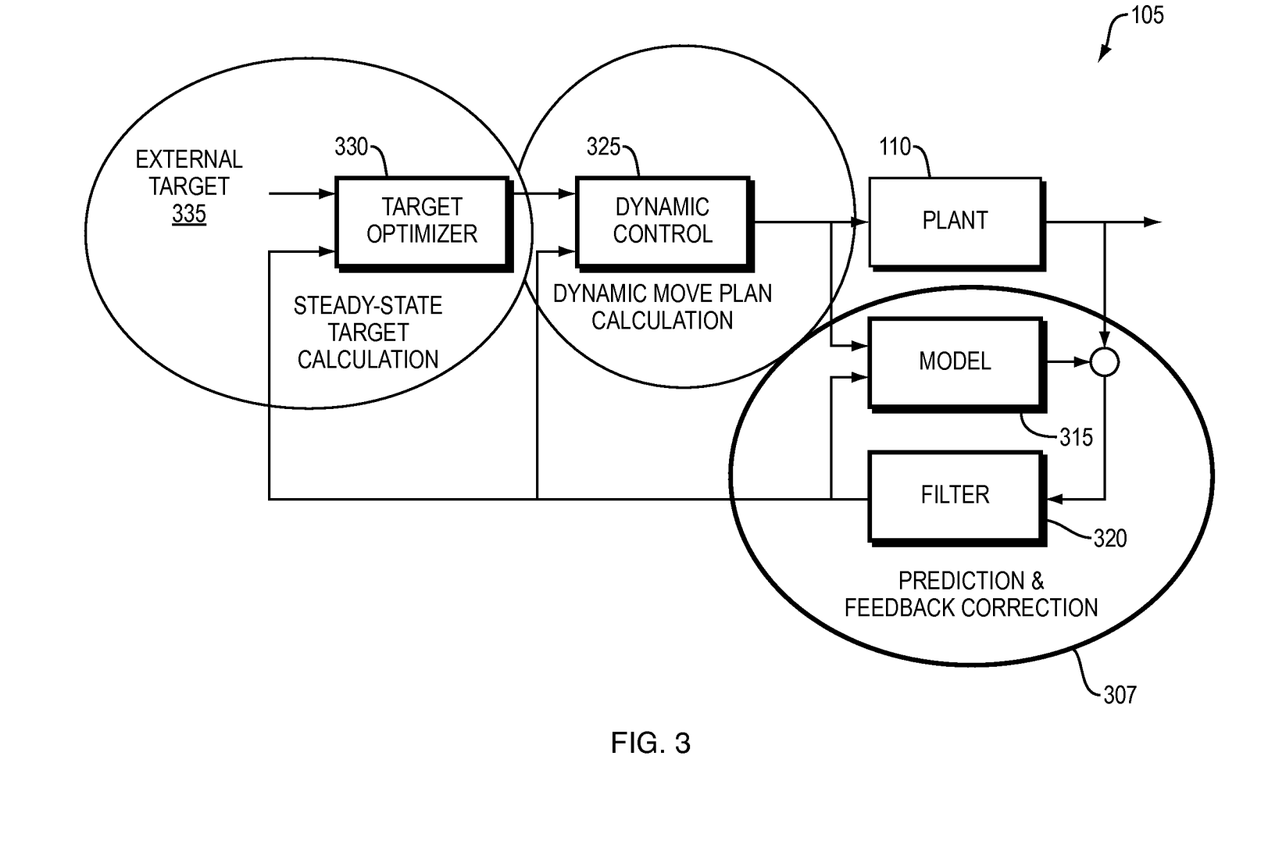
FIG. 3 is an illustration of an example MPC controller configuration in one embodiment of the present invention.

FIG. 3 is an illustration of an example MPC controller 105 configuration in one embodiment of the present invention. The prediction and feedback correction module 307 predicts the plant process 110 based on the past values (open-loop prediction) or based on the proposed future values (closed-loop prediction) of the MVs. There are three forces driving the movement of the MVs in a typical MPC controller 105: (1) the feedback correction; (2) the steady-state target optimization; and (3) the dynamic move plan optimization. While the movement of the MVs from cycle to cycle is intended to improve regulatory and economic optimization performance, the movement can cause undesirable consequences due to issues in the model and/or tuning.

Within the prediction and feedback correction module 307, the model 315 predicts the behavior of the plant process 110. The filter 325 provides feedback correction by removing the prediction bias from model calculation. The filter can be as simple as using the difference between measurement and prediction as a bias to shift the future predictions or as sophisticated as using a Kalman Filter; for more details, see S. Joe Qin & Thomas A. Badgwell, "A survey of industrial model predictive control technology," Control Engineering Practice, 11:733-764 (2003), which is incorporated herein by reference.

The information from the prediction and feedback correction module 307 can be directed back to the target optimizer 330. The target optimizer 330, in conjunction with the external target 335 calculates a steady-state target value for the given run cycle of the process 110. In response to the target optimizer 330, the dynamic control module 325 calculates a move plan based on the calculated steady-state target value. The move plan from the dynamic control module 325 is then implemented into the plant process 110, as well as being incorporated into the model 315. Data from the plant process 110 is then directed back to the prediction and feedback correction module 307 so the cycle can begin again (iterate).

Figure 4A:
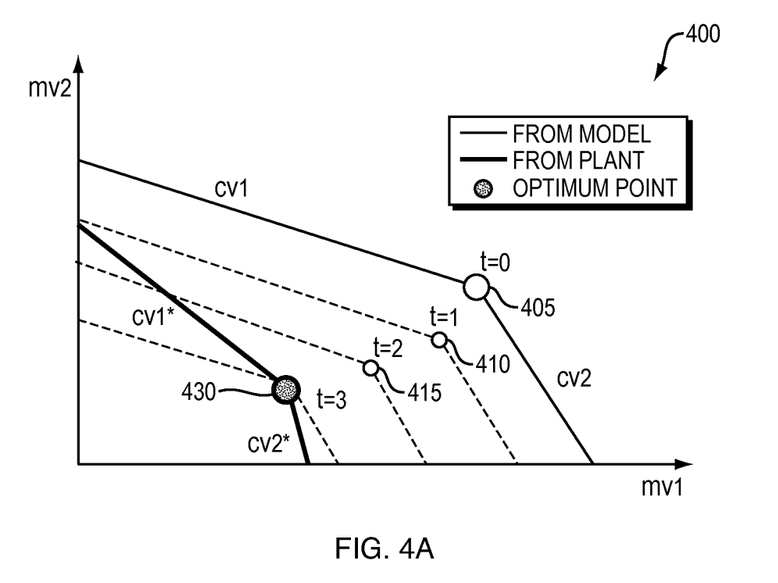
FIGS. 4A and 4B illustrate MPC controller movement towards a steady-state target value for a subject process.
Figure 4B:
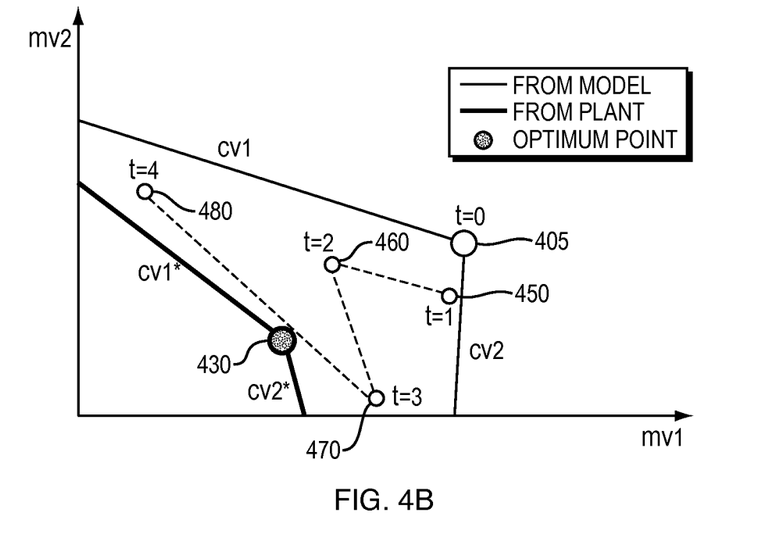

FIGS. 4A and 4B illustrate MPC controller 105 movement towards a steady-state target value for a process 110. In the graph 400 of FIG. 4A, the initial operating point 405 is outside the constraint 430. Recognizing that the initial operating point 405 (at t=0) is outside the constraint 430, the MPC controller 105, during the next cycle, makes a move to bring the operating point 410 (at t=1) closer to the constraint 430. During the next cycle (at t=2), the MPC controller 105 makes another move 415, and continues to move until the operating point (e.g. at t=3) is within the constraint 430. Due to process 110 dynamics and model uncertainty, it is not always possible to reach the constraint 430 during one cycle of the process 110.

FIG. 4B illustrates MPC controller 105 movement with severe model errors. Like FIG. 4A, the initial operating point 405 (at t=0) is outside the constraint 430. In this example, however, the subsequent cycles 450, 460, 470, and 480 (at t=1, 2, 3, and 4, respectively) do not converge towards the constraint 430. Instead, the variables may oscillate, make large movements without improving closed-loop performance, or become trapped at an undesirable operating point. This could render the process 110 inoperable.

Model 315 uncertainty is inevitable in practice. When the uncertainty becomes severe, certain measures need to be included in the controller calculations to prevent the controller 105 from performing inadequately. In the literature, the control robustness normally refers to the closed-loop stability when the model contains uncertainties. Since a typical MPC algorithm explicitly takes variable constraint into consideration, the concept of "MPC robustness" often includes broader requirements in the industrial practice, such as: (1) key variable targets staying steadily at a desirable active constraint set which represents a desirable operating point; (2) exhibiting minimal controlled variable violations unless they are caused by external interferences such as unmeasured disturbances; and (3) no variable oscillation unless caused by external interferences such as an oscillating disturbance or a bad actuator.

The MPC controller 105 of the present invention performs two separate optimization functions for optimizing a model 315 of a plant process 110. The first optimization function is a steady-state target calculation which optimizes an economic objective function while honoring variable constraints. The second optimization function is the dynamic move plan calculation which drives the variables toward the steady-state targets.

The Steady-State Target

The steady-state target is an optimization algorithm that is normally employed to satisfy two requirements: (1) finding a solution which will minimize any controlled variables constraint violation in their steady state; and (2) optimizing the economic benefit if there is room available for the variables to move after meeting the constraint requirement. Economic optimization refers to finding a solution to the model 315 that is designed for operation optimization, i.e., profit maximization or cost minimization. The steady-state target is re-calculated each run cycle to accommodate the feedback correction and any tuning changes. Due to the optimization, some of the MVs and CVs are pushed toward their operating limits, otherwise referred to as active constraints. The number of active constraints is equivalent to the number of manipulated variables.

A method and apparatus for steady-state target calculation is described in U.S. Pat. No. 6,714,899 (by Assignee), which is incorporated herein by reference.

Dynamic Move Plan Calculation

In the Dynamic Move Plan Calculation module (dynamic control at module 325), another optimization algorithm is employed to find a time series for the manipulated variables which can drive the closed-loop responses to reach the requested steady-state targets in an optimal way. Typically, the optimization algorithm tries to minimize a weighted array of errors between the predicted closed-loop dynamic responses and the requested steady-state targets. A mechanism, such as Move Suppression, is also provided to adjust the speed of the manipulated variables movement for a more stable closed-loop performance in anticipating the existence of model uncertainties. Detailed description of Move Suppression is available in S. Joe. Qin and Thomas A. Badgwell, "A survey of industrial model predictive control technology," Control Engineering Practice, vol. 11, 733-764 (2003), which is incorporated herein by reference.

Suboptimal Area Solution

In an example embodiment, the present invention uses the steady-state target optimizer 330 to find a solution that lies inside a predefined "suboptimal area" instead of only finding a solution designed to reach the ideal case optimum (i.e., the steady-state target for a perfect model). This suboptimal area covers the ideal case optimum and a surrounding set of values which is defined by an economic objective function giveaway tolerance and a controlled variable constraint violation tolerance. With the suboptimal area defined, the target will not be changed from cycle to cycle as long as it lies inside the suboptimal area. When using the ideal case optimum, as many number of constraints as the number of manipulated variables can become active and the controller 105 very likely needs to make frequent adjustment at each cycle in responding to the feedback correction. If there is near collinearity in the model 315, some unrealistic degrees of freedom may be explored by the optimizer 330 and this can cause sizable changes in the manipulated variables with marginal improvement in the optimization result. By utilizing the suboptimal area, the steady-state target robustness can be improved, as supported by the following sufficient condition: For a given open-loop stable system, there exists a large enough suboptimal area such that the closed-loop system is also stable.

Figure 5A:
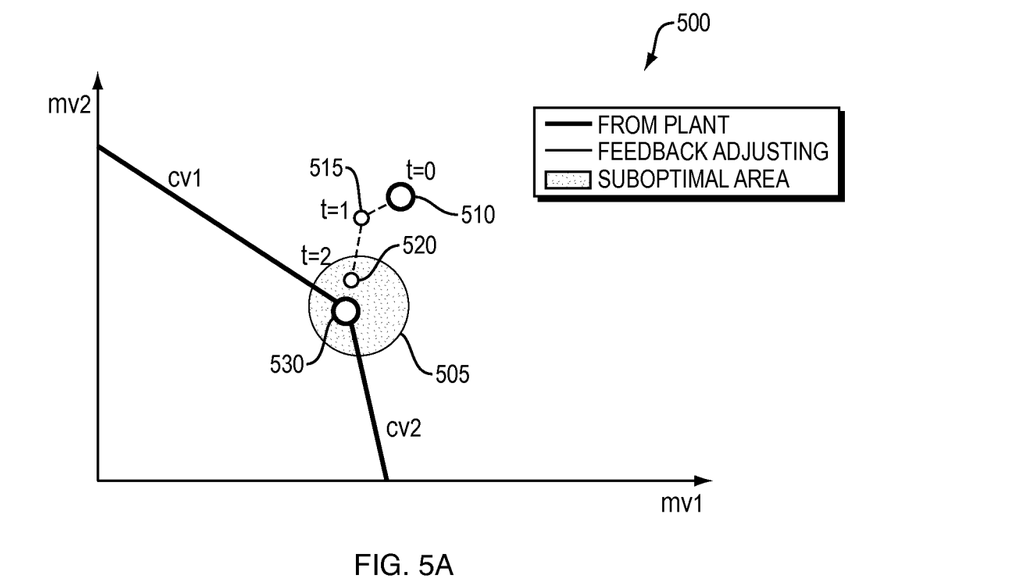
FIGS. 5A and 5B illustrate operation within a suboptimal area for a steady state target.

In practice, however, it is desirable to keep the suboptimal area as small as possible, which creates a tradeoff of optimality for robustness. FIGS. 5A and 5B illustrate operation 500 within a suboptimal area for a steady state target. In FIG. 5A, the suboptimal area 505 is an area around the operation constraint 530. The initial operating point 510 (at t=0) is outside the suboptimal area 505 and the operation constraint 530. The MPC controller 105, during the next cycle will move the operating point 510 to the next operating point 515 (at t=1), and subsequently to operating point 520 (at t=2) during the next cycle. Operating point 520 resides within the suboptimal area 505 (but outside of constraint 530), and therefore the steady state target will not change in the subsequent cycles.

Figure 5B:
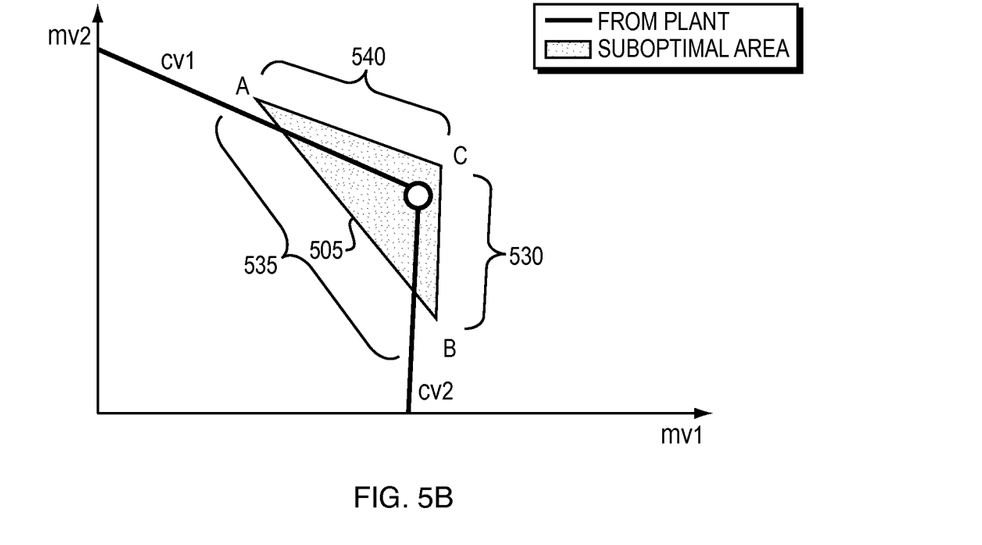

FIG. 5B is an illustration of a graph of a realization of the suboptimal area 505. Line AB 535 is defined by the economic objective function giveaway tolerance, and line AC 540 and BC 530 are defined by the controlled variable constraint violation tolerance.

Finding the suboptimal area 505 for a given process 110 or model 315 is described below. The following examples are only intended to demonstrate how one may use the invention described herein and are not intended to be limiting. A person of skill in the art would recognize alternative equations, notations, or steps that would still be encompassed within the scope of the invention.

For a given cycle of a process, the following notations are used: MVs are the manipulated variables, and are represented as a vector; CV are the controlled variables, and are also represented as a vector; the controller cycles are represented by k, i.e., k=0 is the initial cycle, k=1 is the first cycle, etc.; and MV(k) and CV(k) represent the MVs and CVs for a given cycle. F(MV,CV) represents an economic objective function to be maximized, and CV=H(MV) is the variable relationship in the steady-state (including use in systems that contain integrators). $MV_L$ and $MV_H$ represent the lower and higher constraints, respectively, for the MVs. $CV_L$ and $CV_H$ represent the lower and higher constraints, respectively, for the CVs. Therefore, the conventional steady-state target calculation can be represented by:

$$\text{Max}_{MV} F(MV,CV) \quad \text{Equation 1}$$

where $$CV = H(MV) \quad \text{Equation 2}$$

$$MV_L \leq MV \leq MV_H \quad \text{Equation 3}$$

$$CV_L - S_L \leq CV \leq CH_H + S_H \quad \text{Equation 4}$$

where $S_L$ and $S_H$ are slack variables that make the equations solvable, as not every CV can be controlled inside its constraint.

For a linear system, a typical realization of the above equations can be rearranged and solved by:

$$F(MV,CV) = W^*MV \quad \text{Equation 5}$$

$$CV = G^*MV \quad \text{Equation 6}$$

where W is a weighting factor and G is the steady-state model gain matrix.

This conventional optimization formula is sensitive to the so-called near collinearity in the model relationship F(MV, CV). For example, in a simple 2×2 system (only the steady-state gains are shown):

$$CV1 = -1.01^*MV1 + 1.0^*MV2$$

$$CV2 = 1.0^*MV1 - 1.0^*MV2$$

where the gain ratios between CV1 and CV2 are almost identical: (−1.01/1.0) for CV1 and (1.0/−1.0) for CV2. The present invention is not limited to only 2×2 systems, the system could be a 3×3, 4×4, 6×6 or greater than 6×6 system.

Because of their collinear relationship, making changes to CV1 and CV2 can be quite different for different directions:

Strong direction: ΔMV=(−0.5,0.5)→ΔCV=(1,−1)

Weak direction: ΔMV=(204,205)→ΔCV=(−1,−1)

For example, if MV1 is the reflux flow in a high purity distillation column, MV2 is the reboiler steam, CV1 is the overhead product impurity and CV2 is the bottom product impurity, then improvement of both the overhead and bottoms product quality (both CV1 and CV2 decreasing) requires very large changes in both the reflux and the reboiler, as compared to trading off between the overhead and bottoms quality (one increased while another decreased). If the current operating point is at or close to the CV higher limits and some disturbances cause both of them to drift away from the constraint, the controller may make big moves on MV trying to offset the CV violation even though the violation is benign and probably transitional.

This kind of large size movement due to near collinearity can amplify the control robustness problem and hence some special handling of the near collinearity should be part of the robustness solution, similar to the movement seen in FIG. 4B.

With respect to the dynamic move plan module 325, another optimization equation is employed to find a trajectory for each variable over a certain time period such that the steady-state target can be reached in an optimal way. But, if the speed in reaching the target is too fast and there is significant model uncertainty, there may not leave enough time for the controller 105 to correct using the feedback and hence cause the closed-loop system to behave inadequately, such as some variables may start oscillating. One of the remedies is to provide a tunable parameter called Move Suppression as in Aspen DMCplus (by Assignee). The Move Suppression acts as a weighting factor in the penalty term of MV movement in the dynamic move plan objective function: the larger the Move Suppression, the smaller the rate of change of a manipulated variable.

Figure 6:
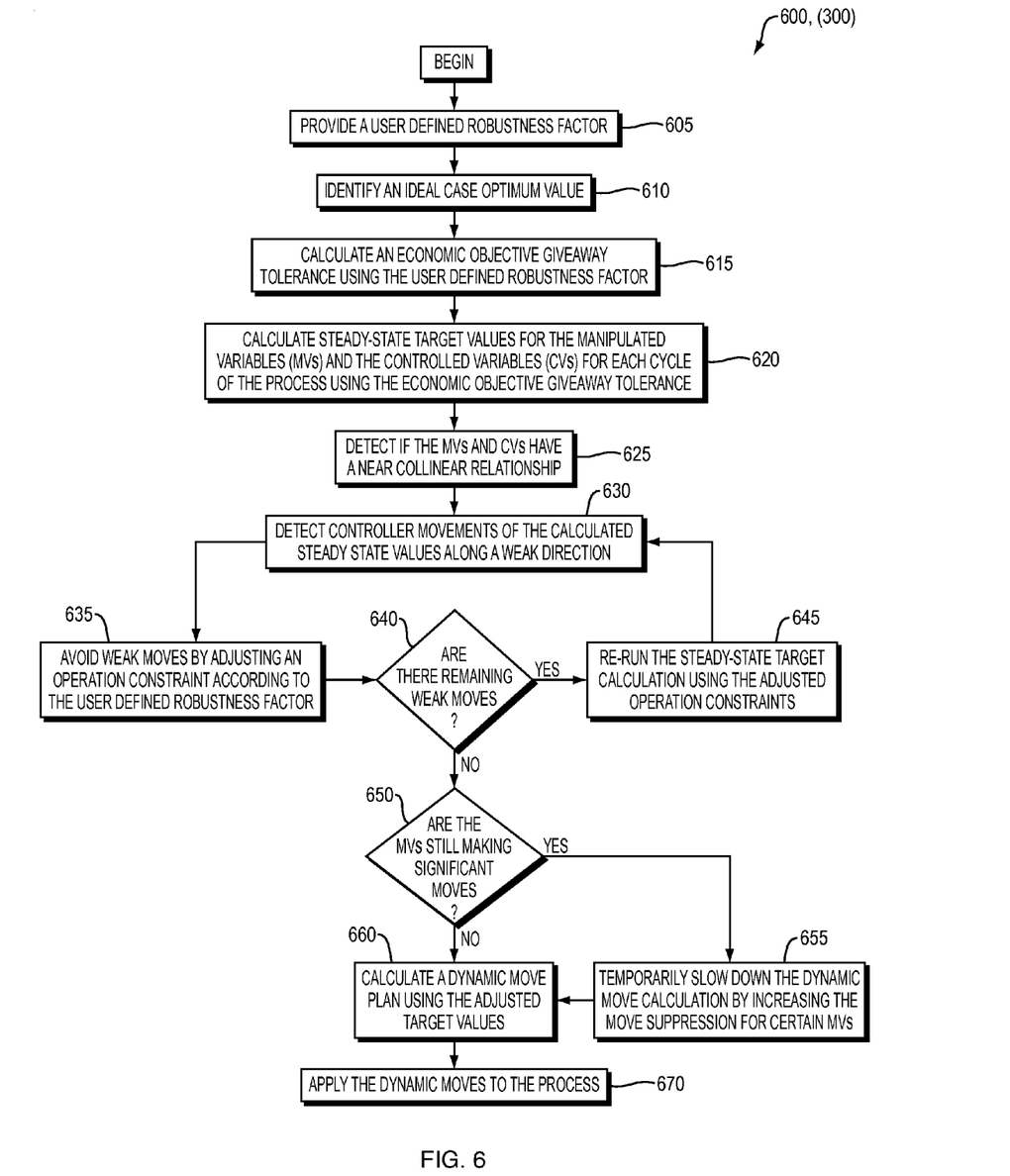
FIG. 6 is a flow chart of an example steady-state target calculation algorithm used in embodiments of the present invention.

FIG. 6 is a flow chart illustrating an example steady-state target calculation algorithm or process 600 used in embodiments of the present invention, for example, used in target optimizer 330, data module 115, and/or MPC Controller 105 generally.

At step 605 a user defines a value for a tunable parameter called Robustness Factor (RF). The robustness factor is a nonzero value greater than 0 and less than or equal to 1. The value is tunable according to how much flexibility the user wishes to introduce into the process. Specifically, the plant 110 may still operate with acceptable efficiency even if the plant does not reach its idea case target values. By providing a user defined robustness factor, the controller 105 may operate at a suboptimal level, which allows the controller to continue running adequately despite poor tuning or modeling errors.

At step 610, target optimizer 330 identifies an ideal case optimum value for the current cycle k by solving the conventional steady-state target equation. The solution is reported as $(MV^a, CV^a)$ and the corresponding objective function value as $$ICF = F(MV^a, CV^a) \quad \text{Equation 7}$$

where ICF is Ideal Case Objective Function value.

At step 615, calculate a modified objective function incorporating the economic objective giveaway tolerance.

At step 620 calculate steady-state target values again for each cycle of the process, using the modified objective function instead of the ideal case optimum value. This is done through equation:

$$\min_{MV} L(MV - MV(k-1)) \quad \text{Equation 8}$$

where:

$$CV = H(MV) \quad \text{Equation 9}$$

$$MV_L \leq MV \leq MV_H \quad \text{Equation 10}$$

$$CV_L - S_L \leq CV \leq CV_H + S_H \quad \text{Equation 11}$$

$$F(MV, CV) \geq ICF * (1 - RF) \quad \text{Equation 12}$$

where, MV(k−1) is the MV target calculated for the previous cycle k−1 and L is a function measuring the changes between the current cycle k and the previous cycle k−1. This modified equation means that a certain amount of optimization giveaway is introduced for the purpose of reducing target changes from cycle to cycle. The solution here is reported as $(MV^b, CV^b)$.

At step 625, the system 105,330 detects if there is any actively constrained MV or CV subset which has a near collinear relationship.

At step 630, the system 105,330 detects whether any of the target moves are along a weak direction. For a detailed description on identifying when target moves occur along a weak direction, refer to U.S. Pat. No. 7,231,264 (by Assignee), which is incorporated by reference in its entirety.

At step 635, the weak moves are avoided (or "blocked"), this is achieved by adjusting the relevant CV slack variables according to the following formulas:

$$S_L = S_L + E_L \quad \text{Equation 13}$$

$$S_H = S_H + E_H \quad \text{Equation 14}$$

where $E_L$ and $E_H$ are the relaxation vectors. The relaxation vectors can be constructed, for example, according to the following equation:

$$\Delta CV = \min(|CV^b - CV(k-1)|, (CV_H - CV_L) * RF) \quad \text{Equation 15}$$

then, $E_{Li} = \Delta CV_i$ if the active constraint is at the lower limit, otherwise $E_{Li} = 0$;

$E_{Hi} = \Delta CV_i$ if the active constraint is at the higher limit, otherwise $E_{Hi} = 0$;

where i is the CV index, i=1, . . . ,n and n≥2. Moreover, if each CV, has different priority setting in the constraint protection, the one having a lower priority value is relaxed first.

At step 640, detect if there are still target moves along the weak direction present. If so, at step 645, the steady-state target calculation is re-run using Equation 1, and the adjusted CV (operation) constraints. The 630-635-640-645 loop is repeated until no weak moves are detected or a maximum number of iterations is reached.

At step 650, determine whether the MVs are still making significant moves. This can be done in a number of ways, such as, for example, counting the number of target changes of sizable magnitude over a certain period of time. If MVs are still making sizable movement or variable oscillation is detected, similar to what is seen in FIG. 4B, at step 655 the system 105, 330 can temporarily increase Move Suppression for the MVs making significant moves. The adjustment for Move Suppression can be determined, for example, by the following equation:

New Move Suppression=Old Move Suppression*(1+ 50*RF)

At step 660, a dynamic move plan is calculated by the dynamic control module 325 using the adjusted target values. At step 670 the dynamic move plan is applied to the process 110.

Figure 7:
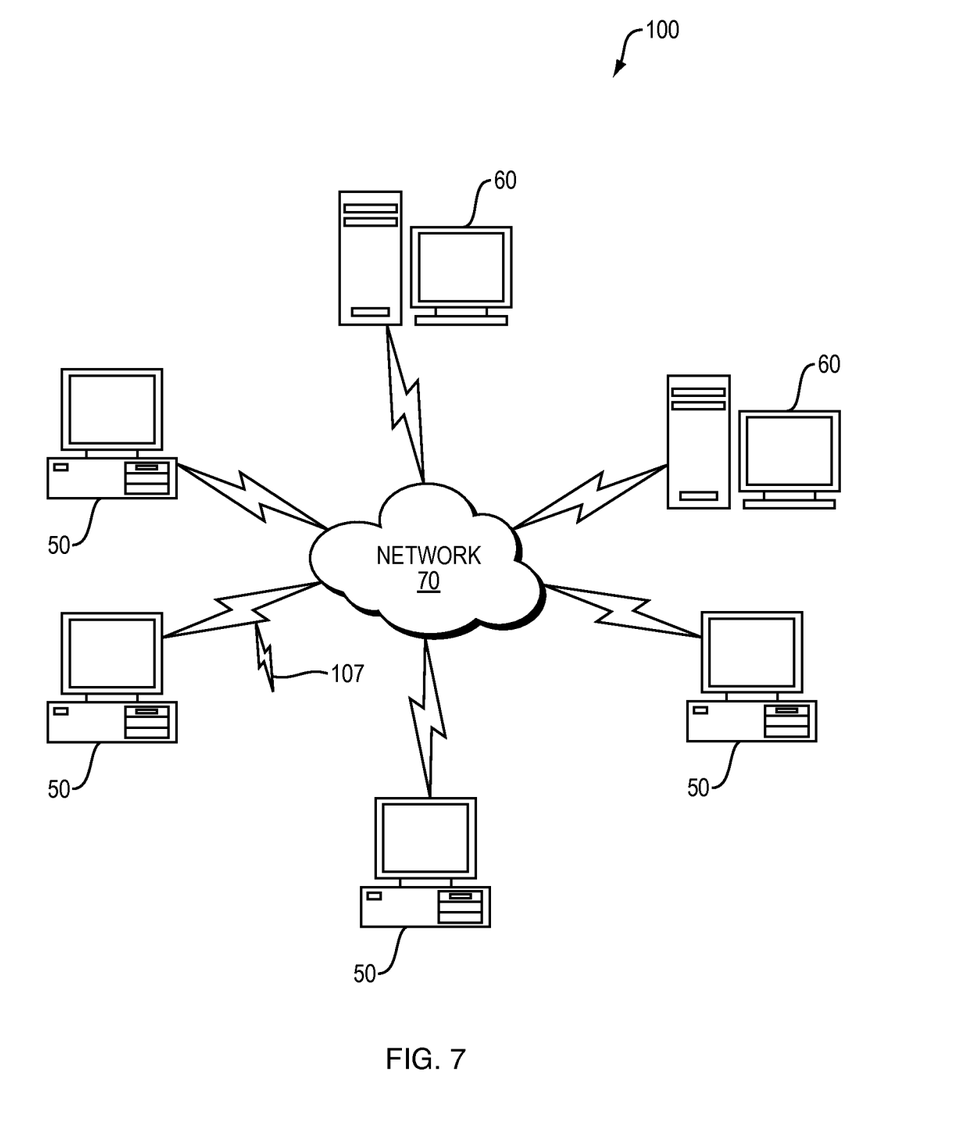
FIG. 7 illustrates a computer network or similar digital processing environment in which the present invention may be implemented.

FIG. 7 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/

IP, Bluetooth, etc.) to communicate with one another. Other electronic device/computer network architectures are suitable.

Figure 8:
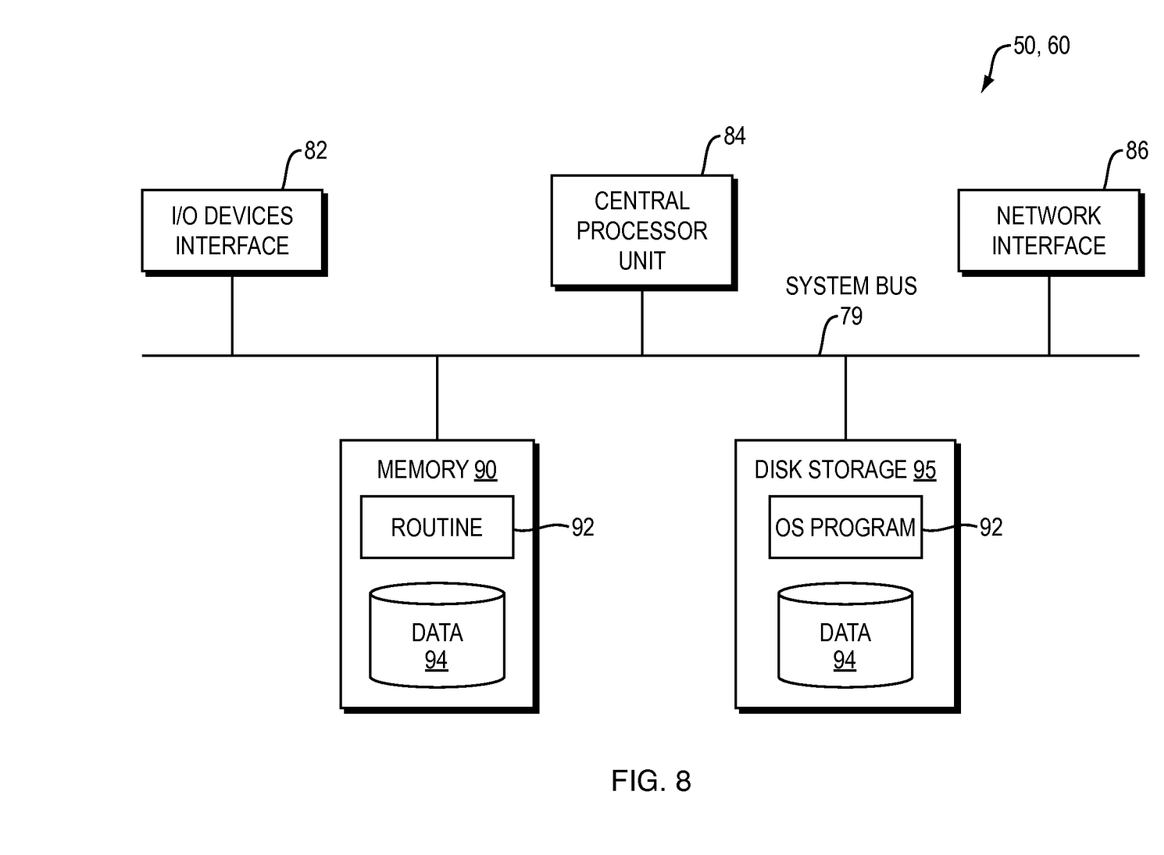
FIG. 8 is a diagram of the internal structure of a computer (e.g., client processor/device or server computers) in the computer system of FIG. 7.

FIG. 8 is a diagram of the internal structure of a computer (e.g., client processor/device 50 or server computers 60) in the computer system of FIG. 7. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 7). Memory 90 provides volatile storage for computer software instructions 92 and data 94 used to implement an embodiment of the present invention (e.g., data module method 115, MPC Controller 105 modules and operations, steady-state target calculations 600, and supporting code detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

Exemplification

Figure 9:
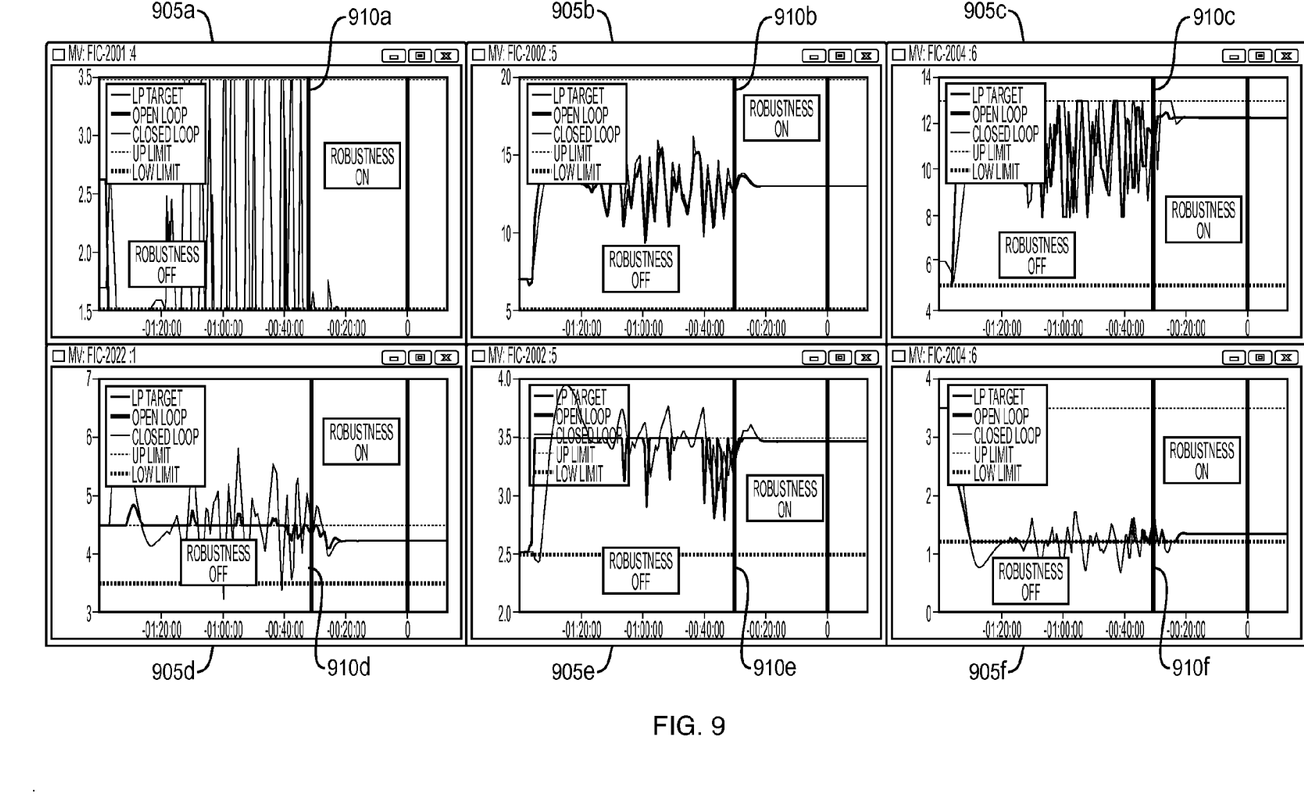
FIG. 9 is a series of MPC controller screenviews comparing performance of a process before and after the robustness algorithm described herein is applied.

FIG. 9 is a series of screenviews comparing performance of a process 110 before and after the robustness algorithm/process 600 described herein is applied. Graphs 905a-f represent six plots of the output from a controller 105 simulated using the plant and model as shown in FIG. 2. After the robustness algorithm 600 is turned on at 910a-f, the process 110 stabilizes during subsequent cycles, indicating that the process 110 is operating within the suboptimal area identified by the algorithm 600.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method of increasing robustness of a Model Predictive Control (MPC) controller, the method comprising:
   (a) using an MPC controller, controlling an industrial process of a plant, said controlling including the MPC controller modeling the industrial process, the modeled process having at least two manipulated variables, at least two controlled variables, and at least one active operation constraint;
   (b) providing to the MPC controller a user defined robustness factor; and
   c) at each control cycle of the MPC controller:
       identifying an ideal case optimum steady-state target value for the modeled process based on an economic objective function;
       calculating an economic objective giveaway tolerance using the user defined robustness factor and the identified ideal case optimum steady-state target value;
       modifying the economic objective function to incorporate the calculated economic objective giveaway tolerance;
       calculating relaxed steady-state target values for the modeled process using the modified economic objective function, the relaxed steady-state target values being calculated to minimize target changes of the at least two manipulated variables between a current control cycle and a previous control cycle;
       detecting whether the calculated relaxed steady-state target values indicate movement of the at least two manipulated variables in a weak direction;
       adjusting, by the MPC controller, the at least one active operation constraint in the relaxed steady-state target values according to the user defined robustness factor, the adjusting avoiding the movement of the at least two manipulated variables along the weak direction; and
       transmitting control signals to adjust the industrial process at the plant based on the calculated relaxed steady-state target values.

2. The method of claim 1, wherein the at least one active operation constraint is a plurality of active operation constraints, and each active operation constraint is assigned a priority, the active operation constraint with the lowest priority being adjusted first according to the user defined robustness factor.

3. The method of claim 1, wherein after adjusting the at least one active operation constraint according to the user defined robustness factor, the steps of the method are repeated until substantially all movement of the at least two manipulated variables along a weak direction is avoided.

4. The method of claim 1, wherein the method further comprises:
calculating a dynamic move plan for implementing the relaxed steady-state target values using the user defined robustness factor, the dynamic move plan employing a move suppression factor to adjust a rate of movement of the at least two manipulated variables towards the calculated relaxed steady state target values,
wherein the rate of movement of one of the at least two manipulated variables being reduced by the move suppression factor, if oscillation is detected in any manipulated variable, and
wherein the control signals to adjust the industrial process are transmitted based on the calculated dynamic move plan.

5. An apparatus for increasing robustness in a MPC controller, the apparatus comprising:
a MPC controller controlling an industrial process of a plant, the MPC controller employing a model of the industrial process, the modeled process having at least two manipulated variables, at least two controlled variables, and at least one active operation constraint, the MPC controller configured to:
(a) receive a user defined robustness factor; and
(b) at each control cycle of the MPC controller:
identify an ideal case optimum steady-state target value for the modeled process based on an economic objective function;
calculate an economic objective giveaway tolerance using the user defined robustness factor and the identified ideal case optimum steady-state target value;
modify the economic objective function to incorporate the calculated economic objective giveaway tolerance;
calculate relaxed steady-state target values for the modeled process using the modified economic objective function, the relaxed steady-state target values being calculated to minimize target changes of the at least two manipulated variables between a current control cycle and a previous control cycle;
detect whether the calculated relaxed steady-state target values indicate movement of the at least two manipulated variables in a weak direction;
adjust the at least one active operation constraint in the relaxed steady-state target values according to the user defined robustness factor, the adjusting avoiding movement of the at least two manipulated variables along the weak direction; and
transmit control signals to adjust the industrial process at the plant based on the calculated relaxed steady-state target values.

6. The apparatus of claim 5, wherein the at least one active operation constraint is a plurality of active operation constraints, and each active operation constraint is assigned a priority, the active operation constraint with the lowest priority being the first active operation constraint adjusted according to the user defined robustness factor.

7. The apparatus of claim 5, wherein after adjusting the at least one active operation constraint according to the user defined robustness factor, the steps of the method are repeated until substantially all movement of the at least two manipulated variables along a weak direction is avoided.

8. The apparatus of claim 5, wherein the computer means further:
calculating a dynamic move plan for implementing the calculated relaxed steady-state target values using the user defined robustness factor, the dynamic move plan employing a move suppression factor to adjust a rate of movement of the at least two manipulated variables towards the calculated relaxed steady state target values,
wherein the rate of movement of one of the at least two manipulated variables being reduced by the move suppression factor, if oscillation is detected in any manipulated variable, and
wherein the control signals to adjust the industrial process are transmitted based on the calculated dynamic move plan.

9. A computer program product for increasing robustness in a Model Predictive Control (MPC) controller, the computer program product comprising:
a non-transitory computer readable storage medium having program instructions stored thereon;
the program instructions, when executed by a digital processor causes the MPC controller to monitor and control an industrial process of a plant by:
(a) modeling the process, the modeled process having at least two manipulated variables, at least two controlled variables, and at least one active operation constraint;
(b) receiving a user defined robustness factor; and
(c) at each control cycle of the MPC controller:
identifying an ideal case optimum steady-state target value for the modeled process based on an economic objective function;
calculating an economic objective giveaway tolerance using the user defined robustness factor and the identified ideal case optimum steady-state target value;
modifying the economic objective function to incorporate the calculated economic objective giveaway tolerance;
calculating relaxed steady-state target values for the modeled process using the modified economic objective function, the relaxed steady-state target values being calculated to minimize target changes of the at least two manipulated variables between a current control cycle and a previous control cycle;
detecting if the calculated relaxed steady-state target values indicate movement of the at least two manipulated variables in a weak direction; and
adjusting the at least one active operation constraint in the relaxed steady-state target values according to the user defined robustness factor, the adjusting avoiding movement of the at least two manipulated variables along the weak direction; and
transmitting control signals to adjust the industrial process at the plant based on the calculated relaxed steady-state target values.

10. The computer program product of claim 9, wherein the at least one active operation constraint is a plurality of active operation constraints, and each active operation constraint is assigned a priority, the active operation constraint with the lowest priority being the first active operation constraint adjusted according to the user defined robustness factor.

11. The computer program product of claim 9, wherein after adjusting the at least one active operation constraint according to the user defined robustness factor, the steps of the method are repeated until substantially all movement of the at least two manipulated variables along a weak direction is avoided.

12. The computer program product of claim 9, wherein the program instructions, when executed by the digital processor, further cause the MPC controller to:
calculate a dynamic move plan for implementing the calculated relaxed steady-state target values using the user defined robustness factor, the dynamic move plan employing a move suppression factor to adjust a rate of movement of the at least two manipulated variables towards the calculated steady state target values,
wherein the rate of movement of one of the at least two manipulated variables being reduced by the move suppression factor, if oscillation is detected in any manipulated variable, and
wherein the control signals to adjust the industrial process are transmitted based on the calculated dynamic move plan.

* * * * *